United States Patent [19]
Gugliotta et al.

[11] 3,816,746
[45] June 11, 1974

[54] APPARATUS FOR INSPECTING HARDWARE ITEMS

[75] Inventors: George Gugliotta, Ridgefield, Conn.; David M. Bradt, Tarrytown, N.Y.

[73] Assignee: Laser Sciences, Inc.

[22] Filed: Apr. 6, 1973

[21] Appl. No.: 348,516

[52] U.S. Cl............ 250/223 R, 209/111.7, 356/241
[51] Int. Cl. ........................................... H01j 39/12
[58] Field of Search.... 250/221, 222, 223 R, 223 B, 250/235; 209/111.7; 356/167, 237, 240, 209, 241

[56] References Cited
UNITED STATES PATENTS

| | | | |
|---|---|---|---|
| 3,386,579 | 6/1968 | Schulze | 250/223 B |
| 3,395,269 | 7/1968 | Klapes | 250/223 R |
| 3,430,766 | 3/1969 | Stone | 250/223 R |
| 3,533,704 | 10/1970 | Krenmayr | 250/223 B |
| 3,565,248 | 5/1969 | Messerschmidt | 209/111.7 |
| 3,628,657 | 12/1971 | Billet | 209/111.7 |
| 3,650,397 | 3/1972 | Bornemeier | 209/111.7 |
| 3,745,354 | 7/1973 | Vargo | 250/219 D |

Primary Examiner—Archie R. Borchelt
Assistant Examiner—D. C. Nelms

[57] ABSTRACT

An apparatus for automatically examining the surfaces of hardware items progressing along a track toward a first receiving location and for urging the items toward a second receiving location when a specified surface condition is detected; viz., the absence of threading. In accordance with the invention, means are provided for determining the entry of a hardware item into a predetermined examination position along the track. Further means are provided for directing a beam of light toward the examination position. A photodetector is disposed to detect the light reflected from the surface of the item at the examination position. Also, deflection means are positioned alongside the track and are responsive to the output of the photodetector to deflect the items toward the second receiving location. In the preferred embodiment of the invention the photodetector is positioned approximately in the path of the beam when assuming the beam to have been reflected off a smooth unthreaded surface. In this preferred embodiment an occurrence indication is generated when the output of the photodetector exceeds a predetermined threshold level. The deflection means is then responsive to this occurrence indication.

9 Claims, 5 Drawing Figures

APPARATUS FOR INSPECTING HARDWARE ITEMS

BACKGROUND OF THE INVENTION

This invention relates to inspection systems and, more particularly, to an apparatus for examining hardware items to determine if threading is present on the surfaces thereof.

The manufacture of small hardware items, such as nuts and bolts, is a largely mechanized highspeed operation. The manufacturing cost of individual units of the finished product may typically be a fraction of a cent, so a careful manual or visual inspection of individual units is generally impractical. Accordingly, such inspection is normally omitted and a disturbing percentage of defective items can appear in any given batch.

In certain instances the presence of even a small number of defective hardware items can have severe consequences. An example is the manufacture of fasteners known as "Teenut" fasteners. These fastener nuts have a small integral body which consits of a cylindrical neck portion and an annular flange which extends radially at one end of the neck. The neck portion has an inner threading which is formed by a stamping operation during manufacture. Unfortunately, the stamping operation is not perfect and some nuts pass through production without receiving an inner threading. The completed fastener nuts are utilized for fastening together larger metal parts, e.g. the body metal of an automobile. If, after a number of nuts have been welded to a body member, it is discovered that one nut is without threading, the whole member can be considered a reject. Worse yet, an improper and incomplete fastening of body members can result from such an occurrence. In view of this possibility, Teenut fasteners are ordinarily inspected visually by workers to segregate non-threaded nuts as a final stage of nut manufacture. This operation insures against the presence of most defects but is subject to human error and involves labor expense.

Accordingly, it is an object of this invention to provide an automatic inspection apparatus which can reliably segeragate hardware items which have missing threading.

SUMMARY OF THE INVENTION

The present invention is directed to an apparatus for automatically examining the surfaces of hardware items progressing along a track toward a first receiving location and for urging the items toward a second receiving location when a specified surface condition is detected; viz., the absence of threading. In accordance with the invention, means are provided for determining the entry of a hardware item into a predetermined examination position along the track. Further means are provided for directing a beam of light toward the examination position. A photodetector is disposed to detect the light reflected from the surface of the item at the examination position. Also, deflection means are positioned alongside the track and are responsive to the output of the photodetector to deflect the items toward the second receiving location.

In the preferred embodiment of the invention the photodetector is positioned approximately in the path of the beam when assuming the beam to have been reflected off a smooth unthreaded surface. In this preferred embodiment an occurrence indication is generated when the output of the photodetector exceeds a predetermined threshold level. The deflection means is then responsive to this occurrence indication.

Further features and advantages of the invention will become more readily apparent from the following detailed description when taken in conjunction with the accompanying drawings.

DESCRIPTION OF THE PREFERRED EMBODIMENT

Figure 1:
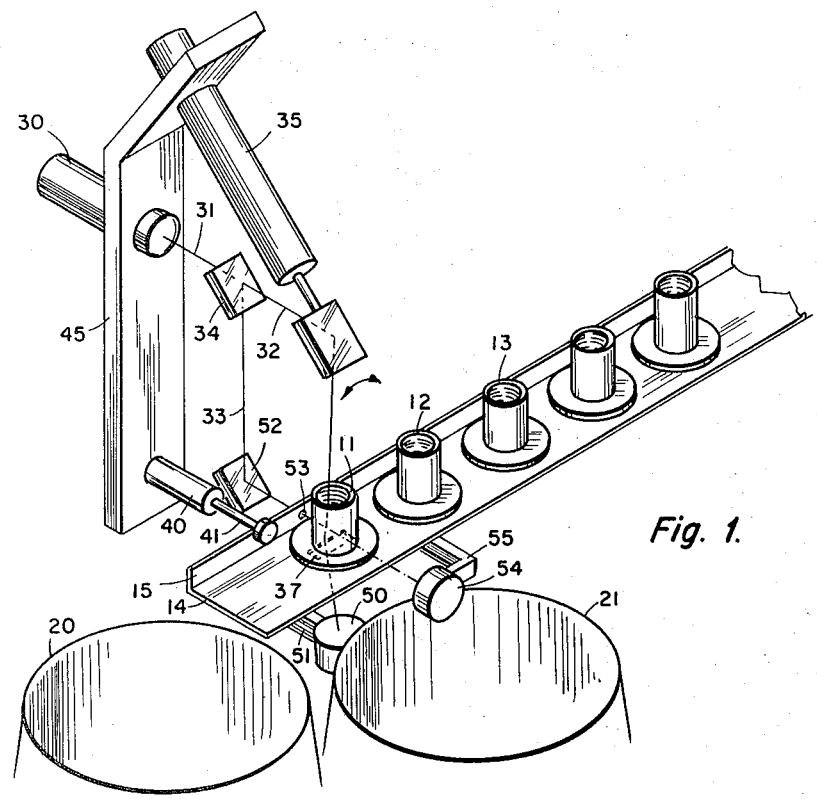
FIG. 1 is an elevational view, partially in perspective, of an embodiment of the invention.

Referring to FIG. 1, there is shown an embodiment of an automatic inspection system in accordance with the invention. A number of Teenut fastener nuts 11, 12 and 13 are illustrated as progressing down a narrow ramp 14 toward a receiving chute 20, the ramp 14 being provided with a side guard rail 15. The nuts will typically have been fed from a commercially available supply bin (not shown) which employs a vibratory action to move the nuts to the ramp in an orderly fashion. A reject chute 21 is provided to receive defective nuts which are deflected toward the chute 21 in a manner to be described.

The inspection system includes a laser 30, a galvanometer-mirror 35 and a solenoid 40 which are mounted on a common support frame 45. The frame 45 may be mounted (by means not shown) on the ramp or on structural members which support the ramp. The laser 30, preferably a low-power device such as a helium-neon gas laser, generates a beam 31 which is split into separate beams 32 and 33 by a beam splitter 34. The beam 32 is referred to as the "inspection beam" and the beam 33 is referred to as the "active beam."

Figure 2:
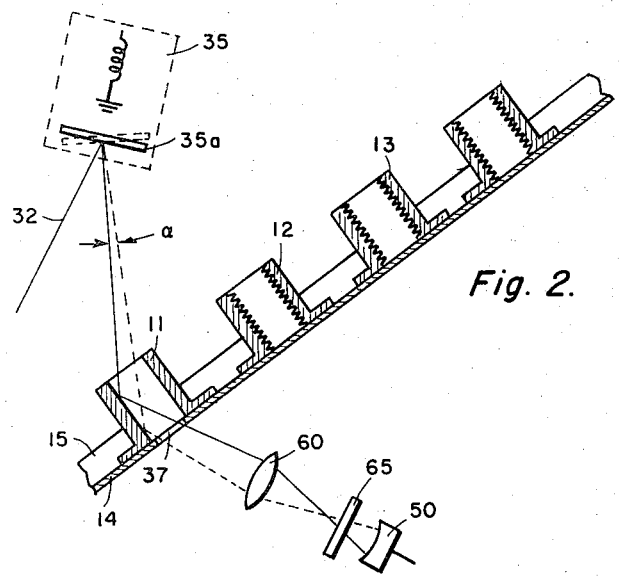
FIG. 2 is a cross-sectional representation of a portion of the embodiment of FIG. 1.

The inspection beam 32 is reflected off the mirror surface of galvanometer-mirror 35 toward the inner surface of the nut 11, which is shown as being located at an "inspection position." The inspection position is generally defined by a small slot 37 in the ramp which is shown in broken line in FIG. 1 and can be visualized in FIG. 2. A photodetector 50 is mounted by a bracket 51 to the ramp 14. Photodetector 50 is positioned to receive, under certain circumstances, most of the energy of the beam 32 after it has been reflected off the inner surface of a nut at the inspection position.

The activate beam 33 is reflected off a stationary mirror 52 and through an aperture 53 in the guard rail 15. When not intercepted by a nut at the inspection position, the beam is ultimately received by another photodetector 54 which is mounted on the ramp 14 by a bracket 55. The output of photodetector 54, or more precisely the absence of same, indicates the presence of a nut at the inspection position. If, during this presence, the output of photodetector 50 indicates that the nut has an unthreaded inner surface, the nut is immediately deflected into the reject chute by action of the plunger 41 of solenoid 40. The solenoid is preferably located at about the inspection position or slightly downstream from the inspection position, depending on the reaction time of the circuitry and solenoid.

FIG. 2 illustrates the manner in which the inspection beam 32 scans the inner surface of a nut at the inspection position. The mirror 35A of galvanometer-mirror 35 is oriented to direct the beam 32 toward a surface which is adjacent the slot 37 and perpendicular to the ramp surface. In the present embodiment, the mirror is driven at a frequency of about 800 HZ and causes the beam to scan over an angle $\alpha$ equal to approximately 4°. The frequency is sufficiently high to insure that the beam scans at least once over the inner surface of the nut passing through the inspection position. In any given system, the available scan time for each nut is determined by the velocity of the nuts passing the scanning position and the nut dimensions, so the selected frequency should take account of the maximum nut velocity.

The photodetector 50 is positioned approximately in the path of the inspection beam when assuming the beam to have been reflected off an unthreaded surface. This is illustrated in FIG. 2 where the nut 11 at the inspection position is depicted as being unthreaded. The extreme positions of the scanning beam are shown in solid and broken line, and it is seen that the photodetector is in a position to receive the beam as it scans over the nut's inner surface, the angle of reflection of the beam off the surface substantially equalling the angle of incidence of the beam thereon. A lens 60 is preferably provided to help collect the light to be received at the photodetector 50. A light filter 65, having a pass characteristic which matches the laser wavelength, is disposed in front of the photodetector. The use of a monochromatic beam in conjunction with the filter is advantageous in minimizing the possibility of ambient light extraneously exciting the photodetector. A light filter can be similarly employed to advantage in conjunction with photodetector 54.

Figure 2A:
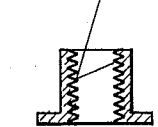
FIG. 2A is a cross-sectional representation of a threaded nut impinged upon by the inspection beam of the invention.
Figure 3:
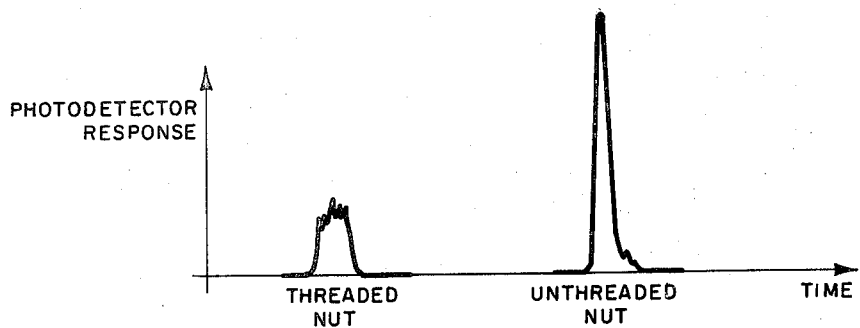
FIG. 3 is a graph of the type of photodetector output signals which are obtained when a threaded nut and an unthreaded nut pass through the inspection position of the invention.

FIG. 2A illustrates the type of reflections the inspection beam experiences when it is incident on a properly threaded inner surface of a nut. As the beam sweeps over the irregular surface it is dispersed in many directions. Some light energy will generally be reflected toward the photodetector, but the overall amount of light received will be less than in the case of an unthreaded nut. FIG. 3 shows the different types of output signals which are obtained from photodetector 50 when a threaded nut and an unthreaded nut pass through the inspection position. A substantially higher intensity peak of light energy is seen to be measured for the unthreaded nut. The threaded nut yields a lower intensity pattern which reveals a series of small peaks that characterize reflection components as the beam is scanned over the individual threads.

Figure 4:
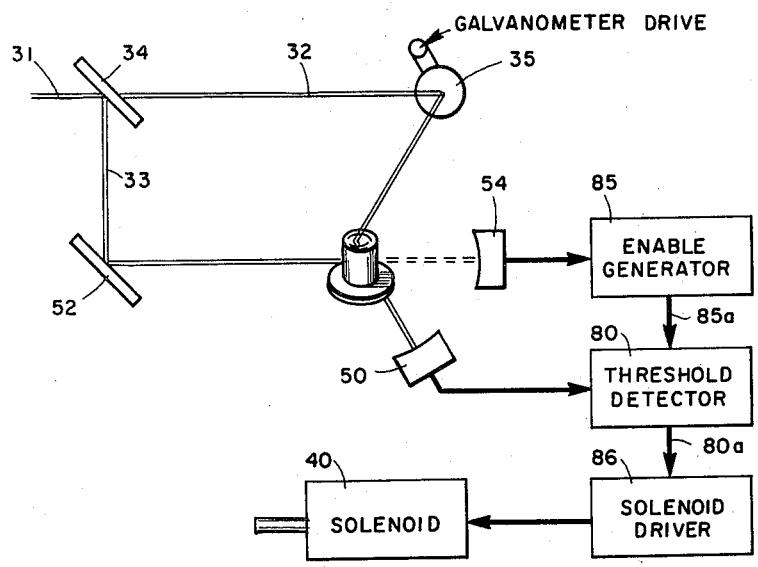
FIG. 4 is a simplified diagram of the operation of the invention including a block diagram of the electronics.

FIG. 4 is a simplified diagram showing the operation of the beams 32 and 33 and a block diagram of the electronics which process the outputs of the photodetectors 50 and 54. The output of photodetector 50 is coupled to a threshold detector 80 which is adjusted to produce an output "occurrence indication" on a line 80A when the photodetector output exceeds a predetermined level contemporaneously with the presence of an enable signal on the line 85A. The detector 80 may include electronic filter means which reduce consideration of photodetector output signals of the type shown in FIG. 3 for an "threaded nut." More specifically, frequency components resulting from scanning the beam over a threading of known geometry can be filtered to prevent spurious occurrence indications and allow a more sensitive setting of the threshold detector 80.

The output of photodetector 54 is coupled to enable generator 85 which produces an enable signal on a line 85A during the time that the photodetector output is below a specified level. In this manner, the threshold detector 80 is enabled only when a nut bore is at the inspection position and blocks the activate beam 33 from being received by photodetector 54. The possibility of extraneous occurrence indications is thus minimized.

The line 80A is coupled to a solenoid driver 86 which is activated by an occurrence indication to energize solenoid 40. The plunger 41 then extends to reject the unthreaded nut which is at or just past the inspection position.

The invention has been described with reference to a particular embodiment, but it will be appreciated that variations within the spirit and scope of the invention will occur to those skilled in the art. As an example, it should be clear that the invention is not dependent upon a particular means for transporting items to be examined along a track defined in space. The items can be transported past the inspection position by any suitable means which allows examination by the light beam.

We claim:

1. In a system where hardware items are progressing along a track past an inspection position, an apparatus for examining a surface of a hardware item located at the inspection position to determine if threading is present on said surface, comprising:
   means for scanning a beam of light over said surface, said scan having a component of motion perpendicular to the direction in which threads are supposed to be running on said surface;
   a photodetector for receiving light reflected from said surface, said photodetector being positioned approximately in the path of the beam when assuming the beam to have been reflected off an unthreaded surface; and
   means responsive to the output of said photodetector for generating an occurrence indication when the output of said photodetector exceeds a prescribed level.

2. The apparatus as defined by claim 1 wherein said beam of light is a laser beam.

3. The apparatus as defined by claim 2 further comprising a light filter interposed between said surface and said photodetector.

4. Apparatus for automatically examining the surfaces of hardware items progressing along a track toward a first receiving location to determine if threading is present on a surface of each item and for urging said items toward a second receiving location when an absence of threading is detected, comprising:
   means for determining the entry of an item into a predetermined inspection position along the track;
   means for directing a beam of light toward said inspection position;

means for scanning said beam transverse the direction in which threads are supposed to be running on a surface of the item at the inspection position;

a photodetector positioned to detect the light reflected from said surface of the item at the inspection position; and deflection means positioned along said track and responsive to the output of said photodetector to deflect said item towards said second receiving location.

5. Apparatus for inspecting hardware nuts to determine if threading is present on the inner surfaces thereof, comprising:

a ramp for carring said nuts, said ramp having a slot which defines an inspection position;

means for generating a laser beam;

means for splitting said laser beam into an inspection beam and an active beam;

means for directing said activate beam over said slot at the inspection position;

first photodetector means for receiving said activate beam in the absence of a nut at the inspection position;

enable means responsive to the output of said first photodetector for generating an enable signal when a nut is at the inspection position;

means for scanning the inspection beam over the inner surface of a nut at the inspection position;

second photodetector means for receiving through said slot the light reflected from said inner surface; and means enabled by said enable signal and responsive to the output of said second photodetector for generating an occurrence indication when the output of said photodetector exceeds a predetermined threshold level.

6. Apparatus as defined by claim 5 further comprising means responsive to said occurrence indications for deflecting unthreading nuts off said ramp.

7. Apparatus as defined by claim 5 further comprising a light filter interposed between said inspection position and said second photodetector.

8. Apparatus as defined by claim 5 wherein said means for generating said occurrence indication includes means for filtering selected frequencies from said photodetector output.

9. Apparatus as defined by claim 5 wherein said second photodetector is positioned approximately in the path of the beam when assuming the beam to have been reflected off an unthreaded surface.

* * * * *